United States Patent Office 2,815,324
Patented Dec. 3, 1957

2,815,324

CUTTING OIL EMULSION CONTAINING ESTER-SALTS OF PHOSPHORIC ACID

Henryk Zenftman, West Kilbride, Scotland, assignor to Imperial Chemical Industries Limited, a corporation of Great Britain No Drawing. Application February 3, 1954,
Serial No. 408,050

Claims priority, application Great Britain April 24, 1953

1 Claim. (Cl. 252—32.5)

This invention is concerned with ester-salts of phosphoric acid and more particularly amine salts of phosphoric acid wherein one hydroxyl group is esterified by an alkyl group containing not more than three carbon atoms and the other hydroxyl group is esterified by the p-tertiary octyl phenyl group.

According to the present invention the new ester-salts of phosphoric acid are amine salts of phosphoric acid wherein one hydroxyl group is esterified by an alkyl group containing not more than three carbon atoms and another hydroxyl group is esterified by the p-tertiary octyl phenyl group and wherein the salt forming portion is an amine group—$NR_2R_3R_4$ where $R_2$ and $R_3$ is each hydrogen, or an alkyl, or a hydroxy-alkyl group having not more than two carbon atoms, and $R_4$ is an alkyl cyclo-aliphatic group each having not more than six carbon atoms.

When expressed ionically the said new ester salts of phosphoric acid are assumed to have the general formula—

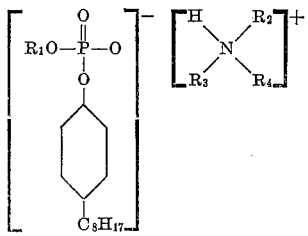

in which $R_1$ is an alkyl group having not more than three carbon atoms, $R_2$ and $R_3$ is each hydrogen, or an alkyl, or a hydroxyalkyl group having not more than two carbon atoms, and $R_4$ is an alkyl or cyclo-aliphatic group each having not more than six carbon atoms.

The ester-salts of the invention include those in which the amine group is derived from monoethylamine, monobutyl-amine, monocyclohexylamine, monoethanolamine, trimethylamine, diethyl-monoethanolamine or triethanolamine.

The ester-salts of the invention may be prepared by reacting an alkyl p-tertiary octyl phenyl hydrogen phosphate with an amine. The reaction may be carried out in water or in an organic solvent, for example one which readily dissolves both reactants but in which the salt produced is only slightly soluble, such as ligroin. Water is particularly useful as a reaction medium in the production of salts having only slight solubility in cold water. Another useful method of carrying out the reaction is to add the amine to the molten alkyl p-tertiary octyl phenyl phosphate while stirring vigorously.

The ester-salts of the invention vary in solubility in hot and cold water, the solubility depending on the nature of the groups $R_2$, $R_3$ and $R_4$. Ferrous metals are not corroded by water which has these compounds dissolved therein in quantities as small as 0.3% by weight. These ester salts also possess emulsifying properties and are especially useful for preparing emulsions of mineral oils in water for use as lubricants, for example as cutting oils or in the drawing or cold working of copper. Aqueous emulsions of mineral oils which include the ester-salts of the invention as emulsifying agents do not cause tarnishing of copper in contradistinction to aqueous emulsions of mineral oils which include sulphonated petroleum fractions as emulsifying agents.

The p-tertiary octyl group in the ester-salts of the invention is believed to have the formula:

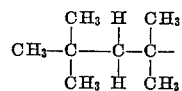

since the p-tertiary octyl phenol used in the preparation of the alkyl p-tertiary octyl phenyl hydrogen phosphate is prepared from isobutylene and phenol.

The cyclohexylammonium salt of methyl p-tertiary octyl phenyl hydrogen phosphate has specially valuable properties. Thus, for example, it can be used for the preparation of self-emulsifying oil compositions, i. e. oil compositions which are able to form oil-in-water emulsions with only slight stirring, for example for use as cutting oils. A suitable composition for such purposes consists of 2 to 3 parts by weight cyclohexylammonium methyl p-tertiary octyl phenyl phosphate, 1.5 to 3 parts by weight cresol, 0.5 to 1 part by weight amyl alcohol, 0.5 to 1.5 parts by weight sodium oleyl sulphate and 100 parts by weight mineral oil. Cutting oils can also be prepared by dissolving 2 to 3 parts by weight of cyclohexylammonium methyl p-tertiary octyl phenyl phosphate in 100 parts by weight mineral oil and vigorously stirring this solution with 100 parts by weight of water to give a stable emulsion which can be diluted with water to any required concentration.

The invention is illustrated by the following examples.

*Example 1*

300 gm. of methyl p-tertiary octyl phenyl hydrogen phosphate are dissolved in 1 litre of ligroin with heating and 100 gm. of cyclohexylamine are gradually added to the solution while the temperature is maintained at 60–70° C. by external cooling. Cyclohexylammonium methyl p-tertiary octyl phenyl phosphate precipitates on cooling and is readilly filtered off. The salt so obtained is soluble in hot water, alcohols, phenols and a number of other organic solvents and is slightly soluble in cold water and cold mineral oils.

A stable oil-in-water emulsion is formed by dissolving 3 gm. of this salt in 100 ml. of a mineral oil by heating and vigorously stirring this solution with 100 ml. of water. The emulsion thus formed can be diluted with water to any desired oil content without loss of stability. The emulsion has the valuable properties of not tarnishing copper, of being non-corrosive to steel and of being particularly suitable as a cutting oil.

*Example 2*

300 gm. of methyl p-tertiary octyl phenyl hydrogen phosphate are dissolved in 600 ml. of ligroin with heating and 75 gm. butylamine are gradually added to the solution. The resulting mixture is allowed to stand overnight and the crystalline salt which precipitates is filtered off. The butylammonium methyl p-tertiary octyl phenyl phosphate so obtained is soluble in water and a number of organic solvents.

A stable oil-in-water emulsion is formed by dissolving 3 gm. of the salt so obtained in 100 ml. of a mineral oil and vigorously stirring the resulting solution with 100 ml. of water.

*Example 3*

30 gm. of methyl p-tertiary octyl phenyl hydrogen phosphate are dissolved in 60 ml. of ligroin with heating and 12 gm. of diethyl monoethanolamine are gradually added to the solution. Diethylmonoethanolammonium methyl p-tertiary octyl phenyl phosphate precipitates and is filtered off.

*Example 4*

Gaseous monomethylamine is passed into a solution of 30 gm. of methyl p-tertiary octyl phenyl hydrogen phosphate in 60 gm. of ligroin until no more is absorbed. Methylammonium methyl p-tertiary octyl phenyl phosphate precipitates and is filtered off, is washed with ligroin (B. P. 40–60° C.) and is dried at 80° C.

0.4 gm. of the salt so obtained is dissolved in 100 ml. of water and a polished steel plate of thickness 0.06 inch is immersed in the solution. After 30 days immersion at room temperature the solution is not discoloured and the plate shows no sign of rust and does not lose weight. If an identical plate is immersed in water not containing the salt, rust occurs after 24 hours and after 30 days there is a loss in weight of about 10%.

*Example 5*

30 gm. of methyl p-tertiary octyl phenyl hydrogen phosphate are added to 100 ml. of water containing 11 gm. of cyclohexylamine. The mixture is heated to about 60° C. and 25 ml. of ethyl alcohol are added to break up the gel which is formed. The reaction mixture is allowed to cool and stand overnight after which the crystalline precipitate of cyclohexylammonium methyl p-tertiary octyl phenyl phosphate is filtered off and dried.

A clear solution is formed by mixing 3 gm. of the salt so obtained with 2 gm. cresol, 1 gm. amyl alcohol, 1.5 gm oleyl sulphate and 1 gm. water and this solution is then dissolved in 100 ml. of a mineral oil. The oil so prepared when added to water emulsifies readily with only slight stirring or shaking.

The same mineral oil containing the same amounts of the above ingredients except for the omission of the cyclohexylammonium methyl p-tertiary octyl phenyl phosphate can not be emulsified with water even with vigorous shaking.

What I claim is:

A cutting oil composition comprising an aqueous emulsion of a mineral oil and cyclohexyl ammonium methyl p-tertiary octyl phenyl phosphate wherein the phosphate is in the proportion of 2 to 3 parts by weight in 100 parts by weight of the mineral oil.

References Cited in the file of this patent

UNITED STATES PATENTS

| | | |
|---|---|---|
| 2,285,854 | Downing et al. | June 9, 1942 |
| 2,371,853 | Smith et al. | Mar. 20, 1945 |
| 2,387,537 | Smith et al. | Oct. 23, 1945 |
| 2,397,377 | Smith et al. | Mar. 26, 1946 |
| 2,397,381 | Smith et al. | Mar. 26, 1946 |
| 2,420,328 | Shipp | May 13, 1947 |
| 2,420,329 | Shipp | May 13, 1947 |

FOREIGN PATENTS

| | | |
|---|---|---|
| 503,349 | Belgium | Nov. 19, 1951 |